(12) United States Patent
Karimisetty et al.

(10) Patent No.: US 8,234,248 B2
(45) Date of Patent: Jul. 31, 2012

(54) TRACKING CHANGES TO A BUSINESS OBJECT

(75) Inventors: Srikanth Karimisetty, Austin, TX (US); Srinivasulu Puri, Irvington, NY (US); Savita Durgada, Irvington, NY (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 12/151,942

(22) Filed: May 9, 2008

(65) Prior Publication Data

US 2009/0193054 A1 Jul. 30, 2009

Related U.S. Application Data

(60) Provisional application No. 61/062,184, filed on Jan. 24, 2008.

(51) Int. Cl.
*G06F 7/00* (2006.01)

(52) U.S. Cl. ........................................ 707/639; 707/642

(58) Field of Classification Search ........................ None
See application file for complete search history.

(56) References Cited

U.S. PATENT DOCUMENTS

| 2003/0172368 A1* | 9/2003 | Alumbaugh et al. ......... 717/106 |
| 2004/0128169 A1 | 7/2004 | Lusen |
| 2005/0114763 A1 | 5/2005 | Nonomura et al. |
| 2006/0041087 A1 | 2/2006 | Cholli et al. |
| 2007/0027938 A1* | 2/2007 | Clarke ........................ 707/204 |
| 2007/0031451 A1 | 2/2007 | Slifka et al. |
| 2007/0220065 A1* | 9/2007 | Coyle et al. .................. 707/203 |
| 2007/0226730 A1* | 9/2007 | Coyle et al. .................. 717/170 |
| 2008/0066019 A1* | 3/2008 | Worek et al. ................. 715/965 |
| 2008/0077848 A1* | 3/2008 | Roberts ....................... 715/229 |
| 2008/0201339 A1* | 8/2008 | McGrew et al. ............. 707/100 |
| 2008/0301171 A1 | 12/2008 | Owen, Jr. et al. |

OTHER PUBLICATIONS

Oracle Corporation, Oracle Mfg Execution System for Process Mfg, Oracle Data Sheet on oracle.com, Jan. 25, 2007 (copyright is 2006), pp. 1-5, Oracle Corp., Redwood Shores, CA.
Oracle Corporation, Lean and Paperless: The New Records Management, A quarterly e-newsletter for enterprises that use Lean Mfg appls., Feb. 6, pp. 1-2, http://www.oracle.com/newsletters/updates/february-2006/lean-manufacturing/lean-paperless.html, Oracle Corp., Redwood Shores, CA.
"Oracle Manufacturing Execution System for Process Manufacturing User's Guide", Oracle, Nov. 2006, pp. 1-136, download: http://download.oracle.com/docs/cd/B34956_01/current/acrobat/120Gmomesug.pdf.
"Guidance for Food Processing/Packaging in Michigan Food Service Establishments", Michigan Department of Agriculture, Jun. 2005, pp. 1-18, download: http://www.michigan.gov/documents/MDS_FS_ProcessingGuideMaster061405_129837_7.pdf.
US Patent and Trademark Office (USPTO) Non-Final Office Action from USPTO U.S. Appl. No. 12/151,943, filed May 9, 2008, having a Notification Date of Sep. 16, 2010, 23 pgs. US Patent and Trademark Office Final Office Action in co-pending U.S. Appl. No. 12/151,943 (filed May 9, 2008), having a notification date of Oct. 11, 2011.

* cited by examiner

*Primary Examiner* — Vei-Chung Liang
(74) *Attorney, Agent, or Firm* — Kraguljac Law Group, LLC

(57) ABSTRACT

Systems, methods, and other embodiments associated with database auditing are described. One example method includes generating a first extensible markup language (XML) document using data from a database object. A database object may include data from multiple relational data tables. The method includes generating a second XML document in response to an event causing a change to the database object. The method also includes comparing the first and second XML documents to identify changed values. The method also includes displaying the identified changes.

24 Claims, 10 Drawing Sheets

---

1010 - Example: Pre-Transaction XML :

```
<ITEM_DETAILS>
    <ITEM>ABC-GOOD</ITEM>
    <UOM>KG</UOM>
    <GRADE>A</GRADE>
</ITEM_DETAILS>
```

1020 - Post-Transaction XML :

```
<ITEM_DETAILS>
    <ITEM>ABC-GOOD</ITEM>
    <UOM>KG</UOM>
    <GRADE>B</GRADE>
</ITEM_DETAILS>
```

1030 - Merged XML :

```
<ITEM_DETAILS>
    <ITEM>ABC-GOOD</ITEM>
    <UOM>KG</UOM>
    <GRADE STATUS='CHANGE' PREVIOUS='A'>B</GRADE>
</ITEM_DETAILS>
```

1010 - Example: Pre-Transaction XML :

```
<ITEM_DETAILS>
        <ITEM>ABC-GOOD</ITEM>
        <UOM>KG</UOM>
        <GRADE>A</GRADE>
</ITEM_DETAILS>
```

---

1020 - Post-Transaction XML :

```
<ITEM_DETAILS>
        <ITEM>ABC-GOOD</ITEM>
        <UOM>KG</UOM>
        <GRADE>B</GRADE>
</ITEM_DETAILS>
```

---

1030 - Merged XML :

```
<ITEM_DETAILS>
        <ITEM>ABC-GOOD</ITEM>
        <UOM>KG</UOM>
        <GRADE STATUS='CHANGE' PREVIOUS='A'>B</GRADE>
</ITEM_DETAILS>
```

Figure 10

TRACKING CHANGES TO A BUSINESS OBJECT

CROSS REFERENCE TO RELATED APPLICATIONS

This application claims the benefit of U.S. Provisional Patent Application Ser. No. 61/062,184 filed Jan. 24, 2008, which is incorporated by reference herein in its entirety.

BACKGROUND

A database object, (e.g. a relational database object), may contain data stored in multiple tables. Typically, database object tables conform to a relational model. The database object may also include information regarding how the database is structured and how data is arranged in the database. Auditing a database object to examine how the database has developed over time can be computationally expensive and inefficient. In some conventional relational databases, correlating changes between one database state and a later database state may not even be possible. Furthermore, some conventional audit infrastructures may be limited to auditing individual database tables.

Some conventional audit systems require knowledge of how a database is structured to be effective. This may include knowing information regarding the data model, how the object is stored in various tables, and their relationships, and how data is arranged in the tables. For example, data from a purchase order can be stored in various tables in a relational database. If the purchase order is audited, the audit system may have to mine tables in the database related to the purchase order to determine what pieces of the purchase order have changed.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 10 illustrates example XML annotations associated with tracking changes to a database object.

DETAILED DESCRIPTION

Figure 1:
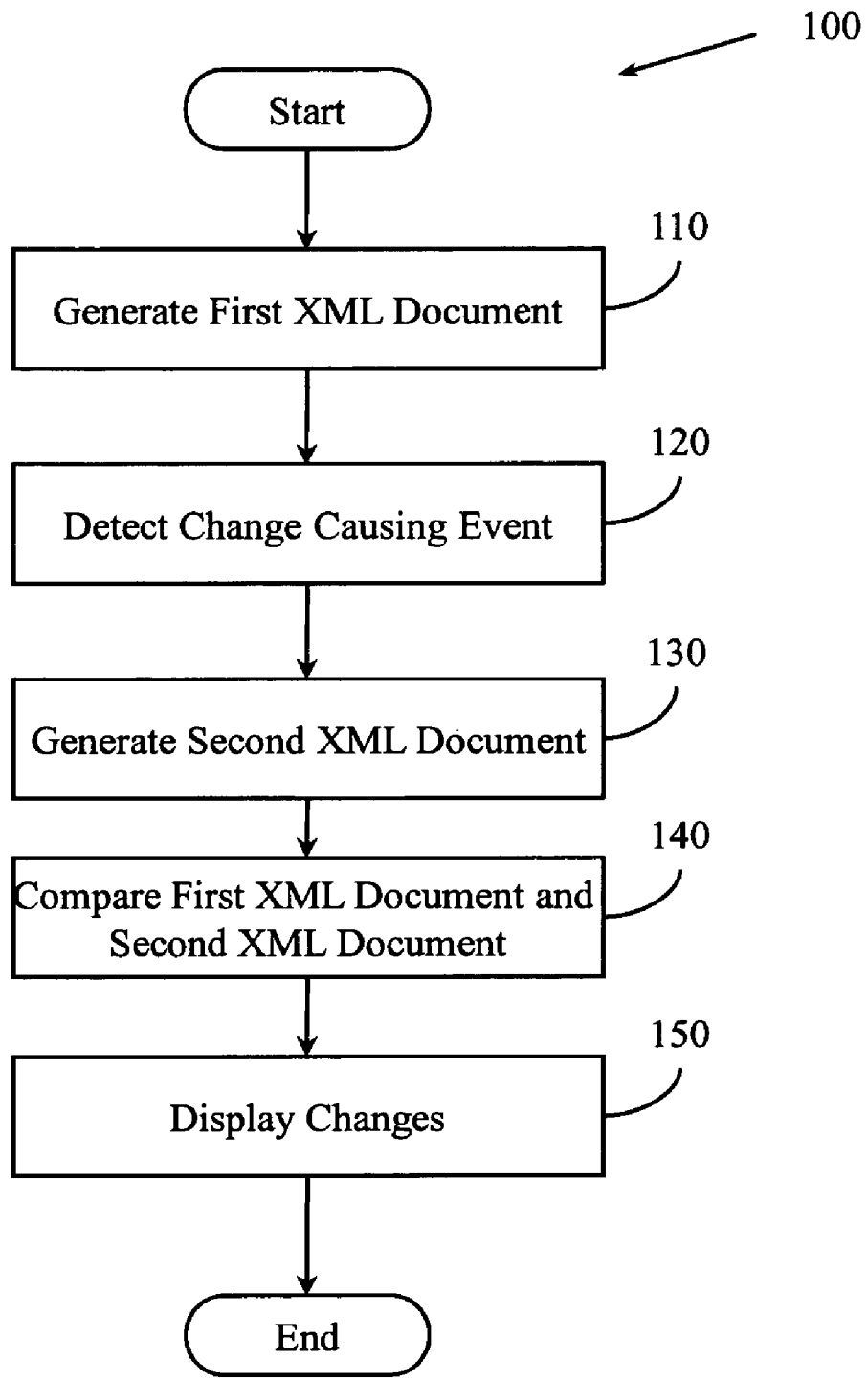
FIG. 1 illustrates an example method associated with tracking changes to a database object.

An example system compares states of a relational database. The example system may reduce or eliminate the need to mine various tables to discover differences between states of a database. The example system includes a comparison logic to compare states of the database and to generate a file detailing the differences between the states. In one example, the file may be an XML document. This file may then be stored. The file may also be employed to display the differences between the states to a user. The generated file may also reduce or eliminate the need for the auditing system to know information regarding the data model, how the database object is stored in various tables, and how data is arranged in the tables.

In another example, prior states of a database may be stored in a data store. The prior states may be represented by documents. In the event that an audit is requested, a comparison logic may merge the stored prior state documents into a merged file. The merged file may then be used to communicate information regarding the audit to the requesting agent. In one example, an extensible markup language (XML) document type may be employed to store prior states of the database. In another example, the merged file used to communicate information regarding the audit to the requesting agent may also be stored in the XML document type.

An example system is provided that can reduce or eliminate the need to mine various tables to determine changes made to a database object. For example, the system includes a logic configured to generate a document from the database object to store a prior state of the database object. An inclusive XML document representing the object is defined, for example, using document type definition (DTD). The system captures a pre-change snapshot and a post-change snapshot of the data object as XML documents. The values from the XML documents are then compared to determine differences. The system can then reconstruct an XML document of the object with old and new values identified in the document. This allows the changes made in the object to be captured as one single document that can be converted to format readable by users, or quickly mined for data by an external logic.

Example systems and methods are provided as a computer-implemented auditing system for business data objects. The example systems and methods can address the auditing of objects within Oracle applications or other types of software applications that includes proper metadata.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities.

Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a computer-implemented method 100 associated with tracking changes to a database object. Method 100 may include, at 110, generating a first extensible markup language (XML) document. Generating an XML document may include acquiring a database dump of the database object, mining the database dump for associated values, and embedding the values into XML tags in an organized manner. The first XML document may be based, at least in part, on data from a database object. The first XML document may also be based on information concerning relationships between database, objects, tables, and/or individual elements. A database object may include data from multiple relational data tables. For example, a database object associated with online sales may store information in a user information table, a purchase order table, a product table, a financial organization table, and so on. A database object may also include information concerning the structure and arrangement of the database. The first XML document may represent a pre-change state of the database object.

Method 100 may also include, at 120, detecting an event causing a change to the database object. Detecting an event may include, receiving an interrupt, periodically checking a stored time stamp or register in memory, and so on. Example database object changes may include, adding an entry, removing an entry, modifying an entry, adding a table, removing a table, modifying a table structure, and so on. In response to detecting the event, method 100, at 130, may generate a second XML document. The second XML document may be based, at least in part, on data from the database object. The second XML document may represent a post change state of the database object.

Method 100 may also include, at 140, comparing the first and second XML documents. The documents may be compared to identify values differing between the first XML document and the second XML document. An example comparison may include a line by line examination to identify areas of the first XML document and the second XML document that contain differing information. Method 100 may also include, at 150, displaying changes identified by the comparison of 140.

In one example, a computer-implemented method is provided that is associated with tracking changes of a database object. For example, the database object can be an object manipulated as part of a software application. The object can be a purchase order, an employee directory, or other type of data object. During the processing of the data object and at some point in time, a first XML document is generated using data from the database object. The first XML document represents a pre-change state of the database object. In response to an event where the database object changes, a second XML document is generated using data from the database object. The second XML document represents a post-change state of the database object. With the two XML documents, the method can then compare the first and second XML documents to identify changed values between them and displaying the identified changes.

By representing the states of the database object as XML documents, the data is converted into a common denominator that is easy to manage and manipulate. Tracking changes between different XML documents is a simplified process as compared to trying to determine differences from the data object itself, which can have data scattered across multiple data tables in multiple locations.

While the figures illustrate various actions occurring in serial, it is to be appreciated that various actions illustrated could occur substantially in parallel. It is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform the methods describe herein and their equivalents. While executable instructions associated with the above method are described as being stored on a computer-readable medium, it is to be appreciated that executable instructions associated with other example methods described herein may also be stored on a computer-readable medium.

Figure 2:
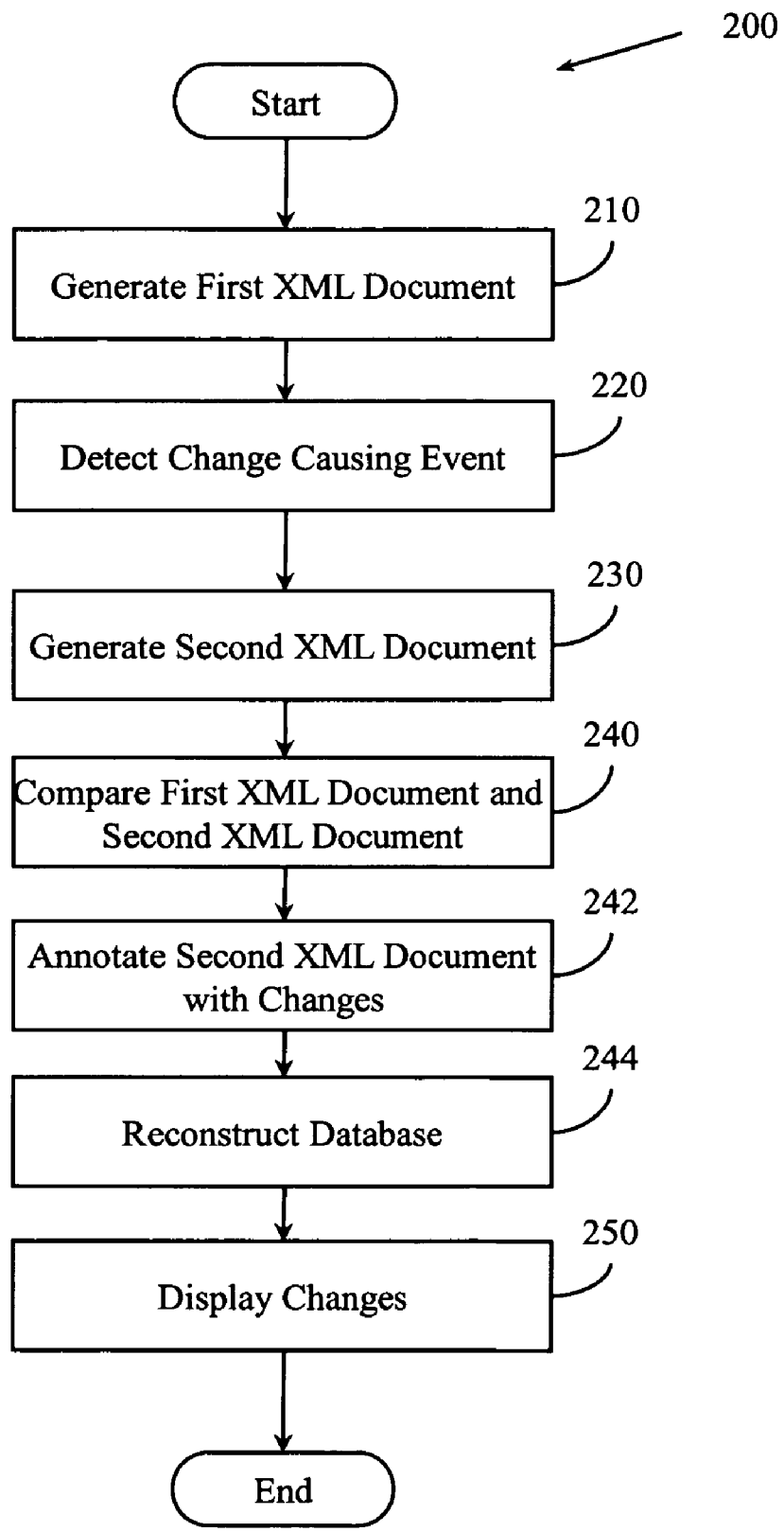
FIG. 2 illustrates an example method associated with tracking changes to a database object.

FIG. 2 illustrates a computer-implemented method 200 associated with tracking changes to a database object. Method 200 may include, at 210, generating a first extensible markup language (XML) document. The first XML document may be based, at least in part, on data from a database object. As described above, a database object may include data from multiple relational data tables and may also include information concerning the structure and arrangement of the database. The first XML document may represent a pre-change state of the database object. An example pre-change state in XML format is shown in FIG. 10 as element 1010.

Method 200 may also include, at 220, detecting an event causing a change to the database object. Example database object changes may include, adding an entry, removing an entry, modifying an entry, adding a table, removing a table, modifying a table structure, and so on. In response to detecting the event, method 200, at 230, may generate a second XML document. The second XML document may be based, at least in part, on data from the database object. The second XML document may represent a post change state of the database object. An example post-change state in XML format is shown in FIG. 10 as element 1020.

Method 200 may also include, at 240, comparing the first and second XML documents. The documents may be compared to identify values differing between the first XML document and the second XML document. An example comparison method may include piping portions the documents into an external document comparison application to identify areas of the first XML document and the second XML document that contain differing information.

While method 200 performs some actions similar to method 100 (FIG. 1), method 200 includes additional actions at 242 and 244. Method 200 may also include, at 242, generating notations in the second XML document. The notations may identify values differing between the first XML document and the second XML document. XML showing example notations is shown in FIG. 10 as element 1030. Method 200 may also include, at 244, reconstructing a database object. Reconstructing the database object may be based on data from the second XML document with the changed values distinguished. Method 200 may also include, at 250, displaying changes identified at 240.

Figure 3:
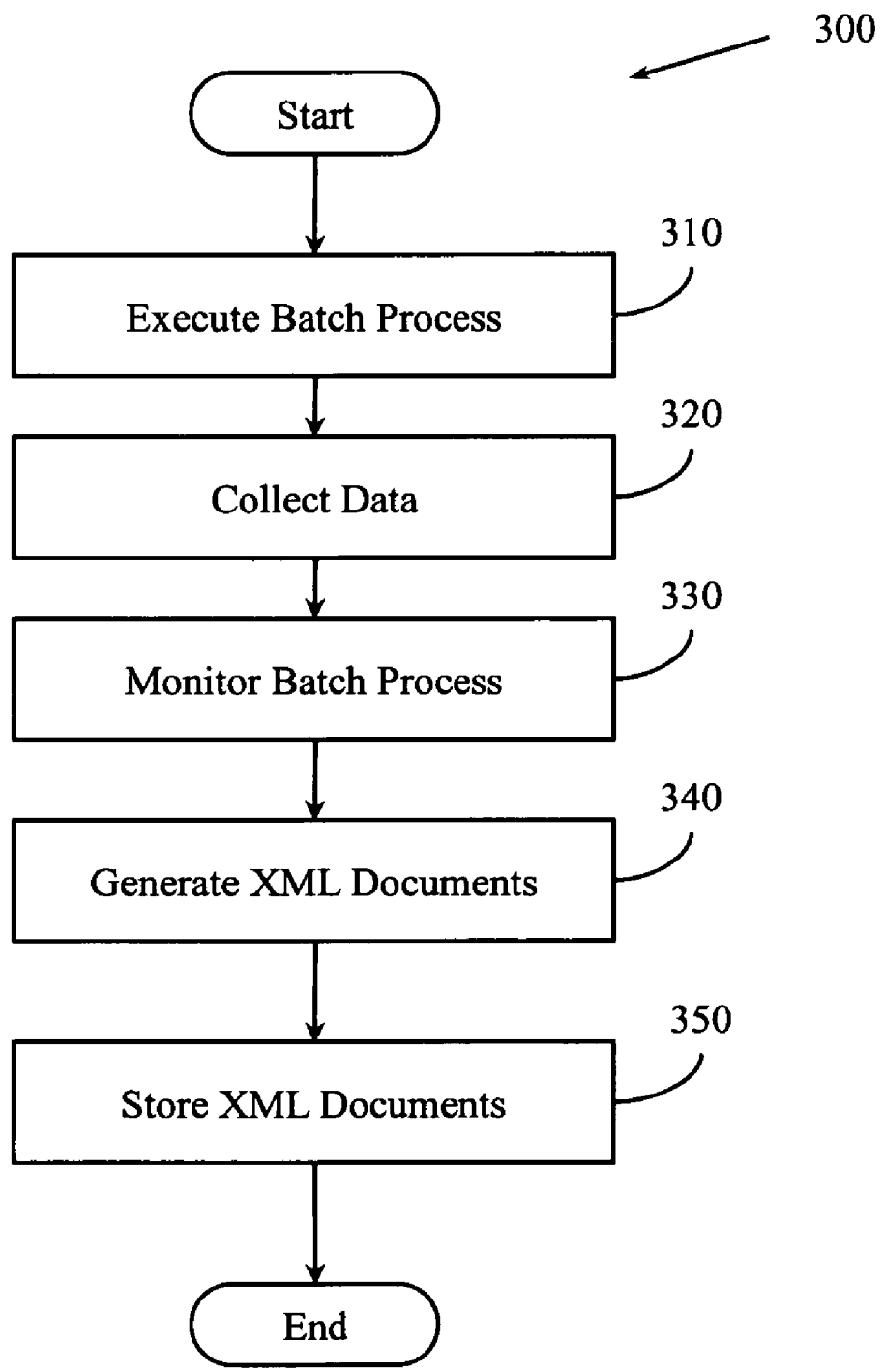
FIG. 3 illustrates an example method associated with tracking changes to a database object.

FIG. 3 illustrates a computer implemented method 300 associated with tracking changes to a database object. Methods 100 (FIG. 1) and/or 200 (FIG. 2) may be employed in various applications. For example, an auditor may be interested in examining how values in a database object have changed over the course of a non-user driven process. Method 300 may include, at 310, executing a batch process. A batch process may include a series of jobs performed by a system with or without user intervention. The batch process may relate to a drug manufacturing process. Method 300 may also include, at 320, collecting data from the executing batch process. Collecting data may include receiving signals to update a database object, storing measurement data, and so on. Data collection 320 may be repeated multiple times while the batch process is executing. Data collected may be stored into a database.

Method 300 may also include, at 330, monitoring the batch process. The monitoring at 330 may facilitate capturing a snapshot(s) of the database at various times. The snapshot(s) may represent the database in a different state. The snapshot(s) of database states may be captured, for example, on time intervals, after a certain number of database updates, in response to a user request, in response to a logic request, and so on. Method 300 may also include, at 340, generating an XML document(s) from the snapshot(s). XML documents may represent data of the corresponding state of the database. Method 300 may also include, at 350, storing an XML document(s) in a machine-readable medium.

In another example, a computer-implemented method is associated with tracking changes of a drug manufacturing process that includes a batch process. The method can include executing the batch process associated with the drug manufacturing process and collecting data from the executing batch process at various times. The collected data is stored in a database. During execution of the batch, the data of the database will change as different aspects of the manufacturing process are performed and completed (e.g. preparing, adding, mixing, heating chemicals/compounds, and so on). When the data is changed, the state of the data object changes since it now has new values. Since some batch processes can run for days, or even weeks before they complete, it may be helpful to be able to identify at a selected time what data changed between certain phases of the batch process.

During execution, the batch process is monitored and a snapshot of the database is captured at various times. A snapshot represents the database in a different state. The snapshot can be taken at one or more predefined events. Then an XML document is generated from snapshots of the database. The XML document represents data of the corresponding state of the database. The XML documents are then stored in a computer-readable medium.

Using snapshots of the data object at various times during the batch process, particular changes from one state to the next can be identified. For example, the method can further include comparing selected first and second XML documents to identify changed data values. The changed data values represent changes made to the database from the associated states of the first and second XML documents at the corresponding points in time during the batch process. Results can then be displayed, for example, by generating a formatted document from the XML document using extensible style sheet language (XSL), rich text format (RTF), or other type of format.

Figure 4:
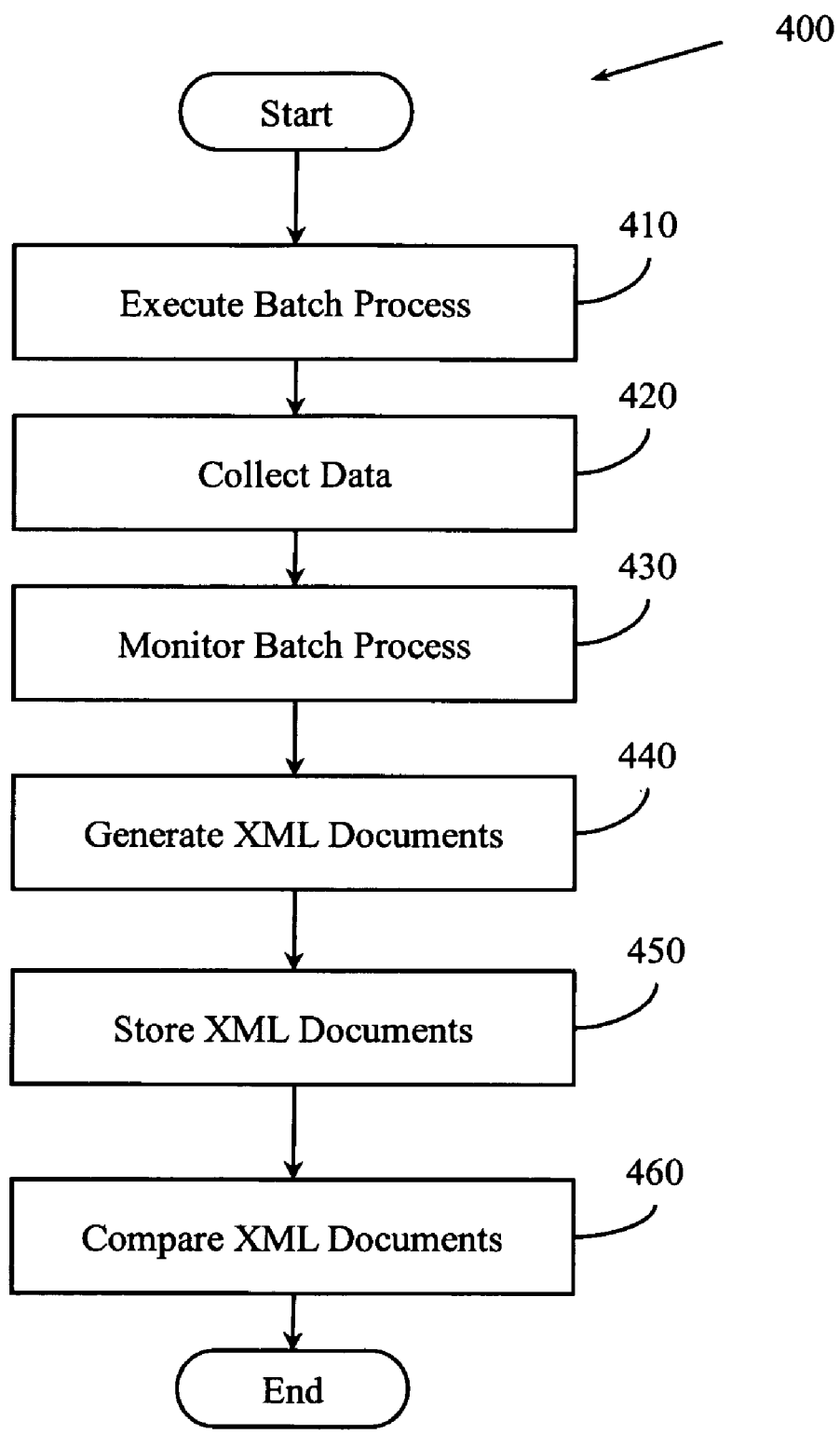
FIG. 4 illustrates an example method associated with tracking changes to a database object.

FIG. 4 illustrates a computer implemented method 400 associated with tracking changes to a database object. Method 400 may include, at 410, executing a batch process. The batch process may relate to a drug manufacturing process. Method 400 may also include, at 420, collecting data from the executing batch process. Data collection 420 may be repeated multiple times while the batch process is executing. Data collected may be stored into a database. Method 400 contains many actions similar to method 300 (FIG. 3), however method 400 also includes an additional action at 460.

Method 400 may also include, at 430, monitoring the batch process. The monitoring at 430 may facilitate capturing a snapshot of the database at different times. Points in time may include, before the batch process is initiated, time intervals during the batch process, between jobs in the batch process, after the batch process has completed, and so on. A snapshot may represent the database state at a point in time. Method 400 may also include, at 440, generating an XML document from a snapshot. An XML document may represent data of the corresponding state of the database. Method 400 may also include, at 450, storing an XML document in a machine-readable medium.

Method 400 may also include, at 460, comparing a selected first XML document and a selected second XML document to identify a changed data value(s). The changed data value(s) may represent changes made to the database from states associated with the first XML document and the second XML document. The changed values may correspond to values in the database object that have been added, removed, changed, and so on over the course of the batch process.

Figure 5:
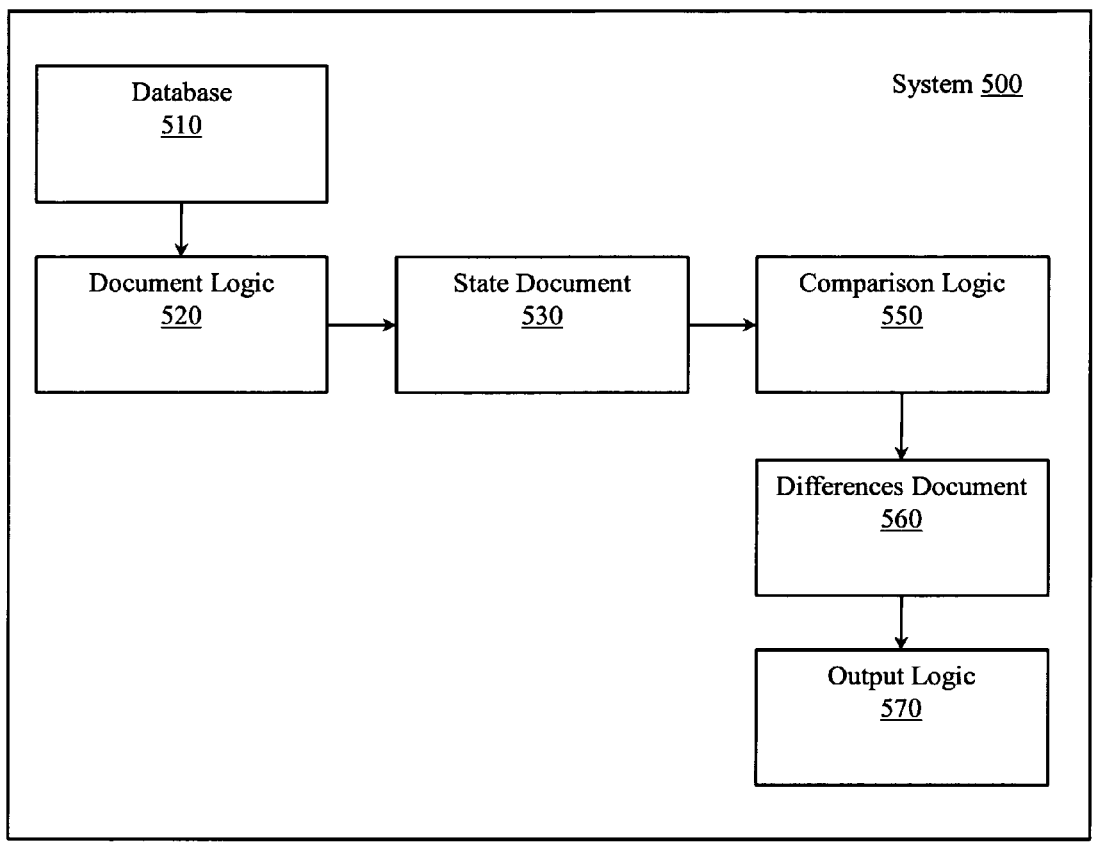
FIG. 5 illustrates an example system associated with tracking changes to a database object.

FIG. 5 illustrates a system 500 associated with tracking changes to a database object. System 500 may include a database 510. Database 510 may include a set of database objects. A database object may include data associated with a set of relational data tables. An example database object may relate to online sales. Relational data tables in an online sales database object may include user information tables, purchase order tables, product tables, financial organization tables, and so on. Information in tables may be linked via common values. For example, elements in a purchase order table may point to elements in a user information table using a user ID value.

System 500 may also include a document logic 520. Document logic 520 may generate a state document 530 upon detecting a change to a database object. The change to the database object may be a result of a user driven query. The change to the database object may also be a result of a logic driven query. A state document 530 may include state data describing a state of a database object. State data may be independent of the structure and arrangement of the database object. Relational databases objects may incorporate a backup utility to preserve information contained in the database. Thus, document logic 520 may mine information preserved by a backup utility to generate an XML state document 530. In one example, state document 530 may be extensible markup language (XML) documents.

System 500 may also include a comparison logic 550. Comparison logic 550 may generate a differences document 560. A differences document 560 may include data describing content differences between state documents. The content differences may concern, for example, changes, additions, deletions, and so on, made to the database object. Comparison logic 550 may generate differences document 560 in response to a user driven request. Comparison logic 550 may also generate differences document 560 in response to a logic driven request. In one example, differences document 560 may be an XML document. XML documents are easy to parse and are simple to understand, making the XML format a suitable document type choice for database auditing. Comparison logic 550 may generate differences document 560 by, for example, merging two or more state documents. System 500 may also include an output logic 570. Output logic 570 may output data from differences document 560. Outputting the data may include outputting the data to a machine readable medium, a graphical user interface, an external logic, and so on.

Figure 6:
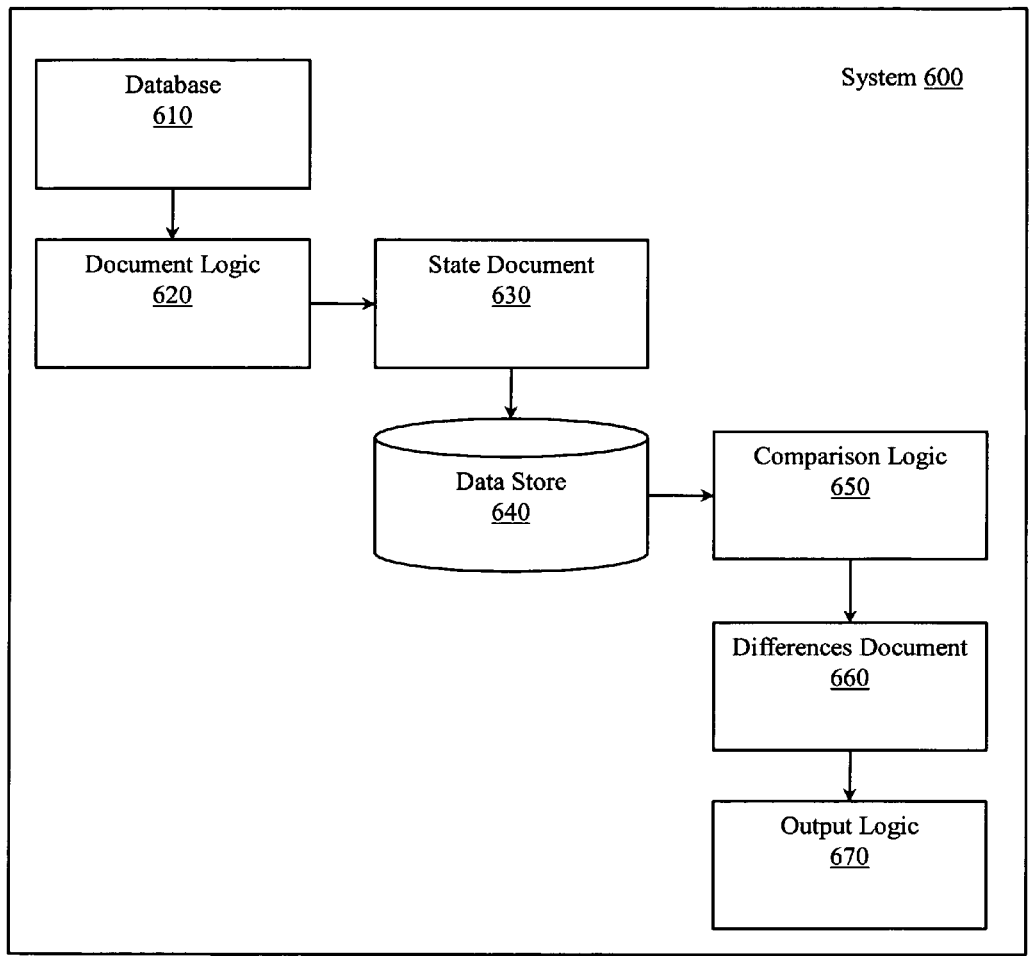
FIG. 6 illustrates an example system associated with tracking changes to a database object.

FIG. 6 illustrates a system 600 associated with tracking changes to a database object. System 600 includes several items similar to those described in connection with system 500 (FIG. 5). For example, system 600 includes a database 610, and a document logic 620 that produces a state document 630. However, system 600 may include additional elements.

For example, system 600 may also include a data store 640. Data store 640 may store state documents. Data store 640 may also store a state document containing state data describing a current state of a database object. System 600 may also include a comparison logic 650. Comparison logic 650 may generate a differences document 660. Differences document 660 may include data describing content differences between state documents. In one example, storing state documents to a data store may facilitate comparison logic 650 comparing state documents with larger intervals between their generations. In one example, an interval may be the time between the generation of a first state document and a second state document. System 600 may also include an output logic 670. Output logic 670 may output data from differences document 660. For example, output logic 670 may output data to a machine readable medium, a graphical user interface, an external logic, and so on.

Figure 7:
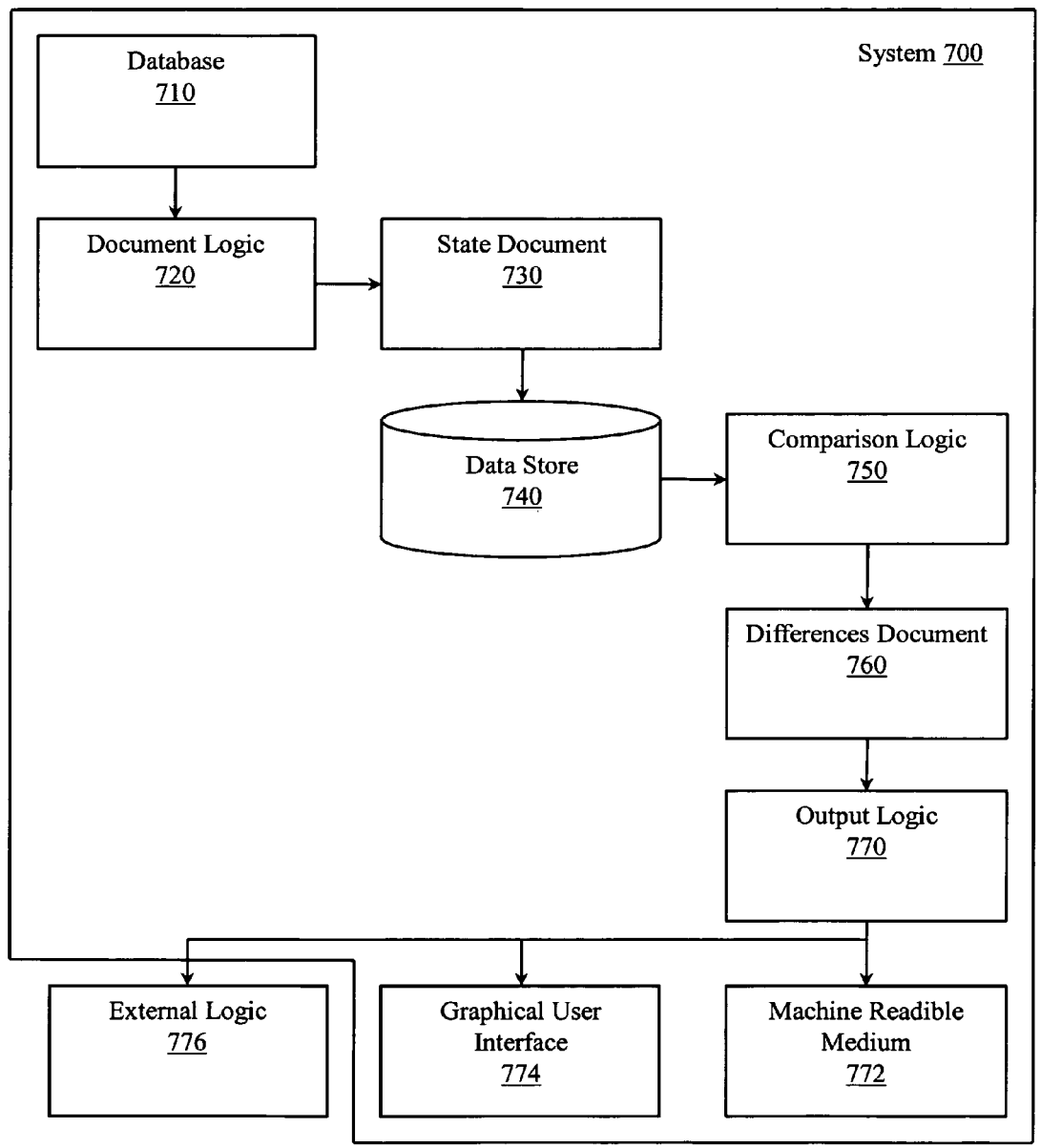
FIG. 7 illustrates an example system associated with tracking changes to a database object.

FIG. 7 illustrates a system 700 associated with tracking changes to a database object. System 700 includes several elements similar to those described in connection with system 600 (FIG. 6). For example, system 700 includes a database 710, a document logic 720 that produces a state document 730, a data store 740 to store state documents, and a comparison logic 750 that produces a differences document 760. However, system 700 may include additional elements.

System 700 may also include an output logic 770. Output logic 770 may output data from differences document 760. Output logic 770 may output data from differences document 760 to a machine readable medium 772. Storing data from differences document 760 to machine readable medium 772 may facilitate examining data from differences document 760 at a later time. Storing data to machine readable medium 772 may also facilitate transferring the data to another location. Output logic 770 may also output data from differences document 760 to a graphical user interface 774. In one example, data output to graphical user interface 774 may be based on user driven input. This may enable a user to select specific information to be displayed. This may also enable a user to omit irrelevant information from being displayed. Output logic 770 may also output data from differences document 760 to an external logic 776. External logic 776 may be, for example, an auditing logic that maintains the integrity of the database objects.

Figure 8:
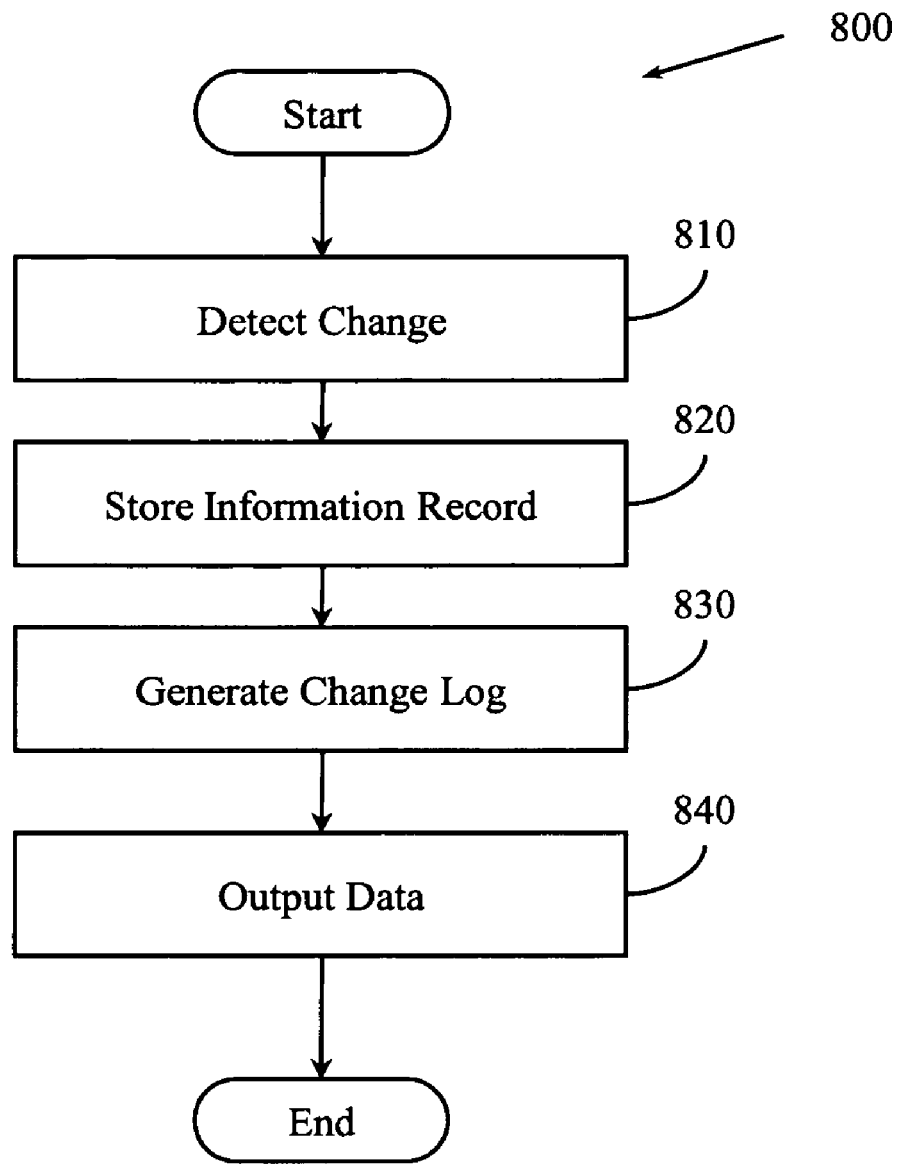
FIG. 8 illustrates an example method associated with tracking changes to a database object.

FIG. 8 illustrates a method 800 associated with tracking changes to a database object. Method 800 may include, at 810, detecting a change to a database object in a database. The change to the database may be the result of a user driven query, and/or a logic driven query. Example logics may include online purchasing systems, online forum systems, warehouse inventory management systems, weather tracking systems, and so on. Therefore, the change may be, for example, in response to a signal provided by a logic requiring no user input beyond initiating the logic. A database object may include data from a set of relational data tables. Method 800 may also include, at 820, storing information records to a data store. An information record may include information describing a condition of a database object. The information describing the condition of the database object may be independent of the structure and arrangement of the database object. In one example, an information record may be a state document. A state document may be an extensible markup language (XML) document.

Method 800 may also include, at 830, generating a change log. The change log may include data describing content differences between information records stored in the data store. In one example, an information record may be a differences document. A differences document may be an XML document. Method 800 may also include, at 840, outputting data from the change log. Data from the change log may be output to a display logic, a machine readable medium, an external logic, and so on.

Figure 9:
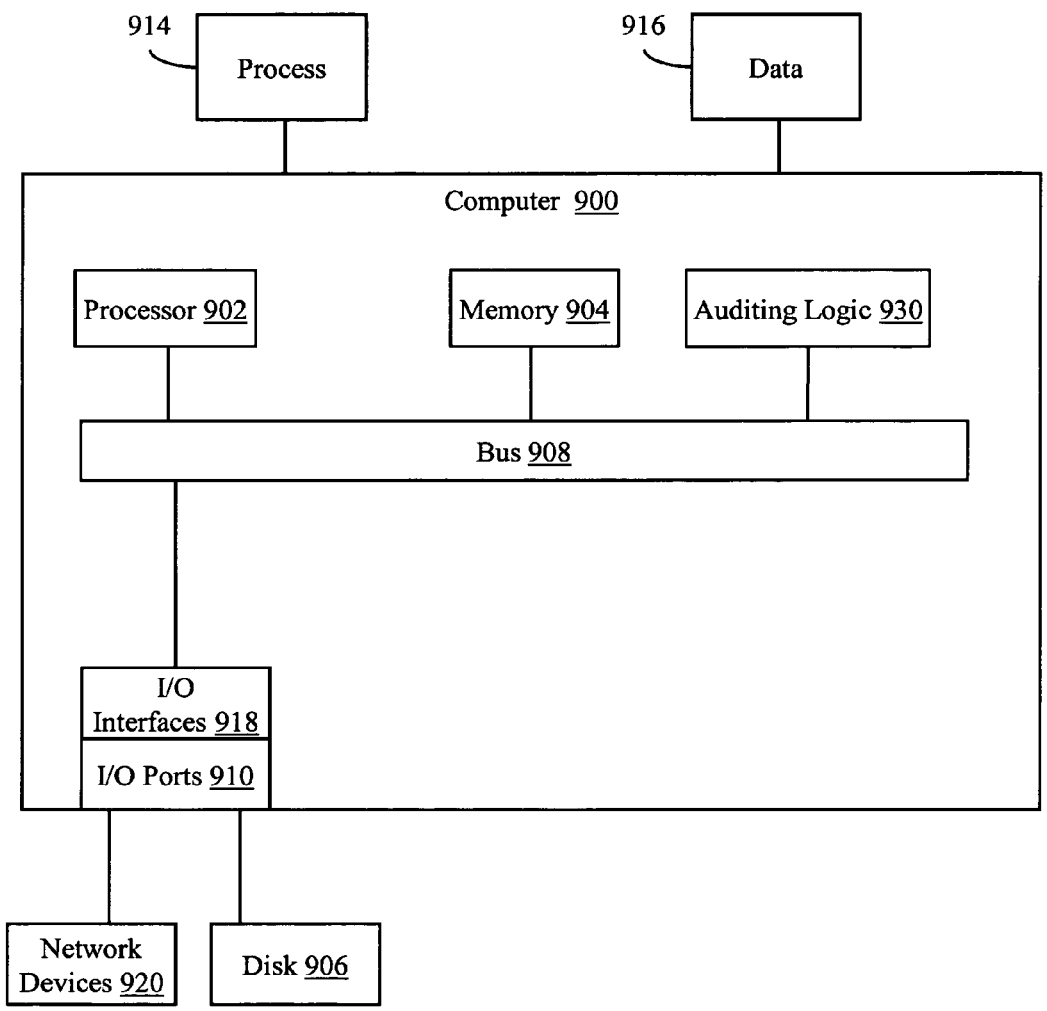
FIG. 9 illustrates an example computing environment in which example systems and methods illustrated herein can operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include an auditing logic 930 configured to facilitate auditing databases. In different examples, the auditing logic 930 may be implemented in hardware, software, firmware, and/or combinations thereof. While the auditing logic 930 is illustrated as a hardware component attached to the bus 908, it is to be appreciated that in one example, the logic 930 could be implemented in the processor 902.

Thus, auditing logic 930 may provide means (e.g., hardware, software, firmware) for detecting a change to a database object in a database where the database object may include data from a set of relational data tables. Auditing logic 930 may also provide means for generating a state document. A state document may include state data describing a state of a database object. Auditing logic 930 may also provide means for storing state documents. Auditing logic 930 may also provide means for comparing content differences between state documents. Auditing logic 930 may also provide means for generating a differences document. A differences document may include data describing content differences between state documents. Auditing logic 930 may also provide means for outputting data from the differences document.

The means may be implemented, for example, as an ASIC. The means may also be implemented as computer executable instructions that are presented to computer 900 as data 916 that are temporarily stored in memory 904 and then executed by processor 902.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
performing a database dump of substantially all user content of a database;
generating a first extensible markup language (XML) document using data from the database dump of the database, the first XML document representing a pre-change state of the database;
performing a second database dump of substantially all user content of the database in response to an event causing a change to the database;
generating a second XML document using data from the second database dump, the second XML document representing a post-change state of the database;
comparing the first and second XML documents to identify changed values where identifying changed values includes generating notations in the first XML document by adding XML tags to the first XML document that describe a change to the database from the second XML document, where the notations provide a history of changes in the first XML document; and
displaying the identified changed values.

2. The computer-implemented method of claim 1, where identifying changed values includes modifying XML tags in the first XML document by adding elements to XML tags, and where the elements describe a change to the database.

3. The computer-implemented method of claim 2, where displaying the identified changed values includes reconstructing a database from the first XML document by using the notations to highlight changed values, where the changed values include a structure of the database and data associated with the database.

4. A computer-implemented method, comprising:
executing a batch process for a drug manufacturing process;
collecting data from the executing batch process at various times and storing the data into a database;
monitoring the batch process and capturing a snapshot of the database at a plurality of times, where a snapshot is of the whole database and represents the database in a different state;
generating an extensible markup language (XML) document from each of the snapshots of the database, the XML document representing data of the corresponding state of the database;
comparing a selected first XML document and a selected second XML document to identify changed data values, where identifying the changed values includes generating notations by adding XML tags to the second XML document that describe the changed values, and where the notations provide a history of changes in the first XML document; and
storing each of the XML documents in a computer-readable medium.

5. The computer-implemented method of claim 4, where the changed data values representing changes to the database from the associated states of the first and second XML documents.

6. A system, comprising:
at least one non-transitory computer-readable medium that stores a database that includes one or more database objects, where a database object includes data associated with one or more relational data tables;
a non-transitory computer-readable medium comprising a document logic to generate a state document upon detecting a change to one of the one or more database objects, where a state document includes state data from a database dump describing a state of a database object, where the state data is independent of the structure and arrangement of the database object;
a comparison logic to generate a differences document that includes notations that are tags describing content differences between two or more state documents to provide a history of changes for the one or more database objects, where the tags include elements describing content differences by notating a change and a previous value; and
an output logic to output data from the differences document.

7. The system of claim 6, where a state document is an extensible markup language (XML) document.

8. The system of claim 7, where the differences document is an XML document, and where the tags are XML tags in the differences document that include elements describing the content differences by notating a change and a previous value.

9. The system of claim 8, where the comparison logic generates the differences document by merging the two or more state documents.

10. The system of claim 9, including a data store to store state documents, and where state data describing a current state of a database object is stored in a state document in the database.

11. The system of claim 10, where the output logic stores data from the differences document to a machine readable medium that includes a set of previous differences documents.

12. The system of claim 10, where the output logic supplies data from the differences document to an external logic.

13. The system of claim 9, where the comparison logic generates the differences document upon receipt of a user driven request.

14. The system of claim 6, where the change to the database object is a result of a user driven query.

15. The system of claim 6, where the change to the database object is a result of a logic driven query.

16. The system of claim 6, where the document logic performs a data mining operation on the database dump to retrieve state data to generate the state document.

17. The system of claim 6, where the output logic displays the output data using a graphical user interface.

18. A non-transitory computer-readable medium storing processor executable instructions that when executed by a processor cause a machine to perform a method, the method comprising:

detecting a change to a database object in a database, where a database object includes data from one or more relational data tables;
performing a database dump of the database after detecting the change to the database;
storing one or more information records in a data store, where an information record includes information describing a condition of the database object from the database dump, where the information is independent of the structure and arrangement of the database object state;
generating a change log that includes data describing content differences between two or more information records stored in the data store, where generating the change log includes generating a differences document as the change log, where the content differences include XML tags that describe a change and a previous state in the database where the XML tags provide a history of changes for the database in the differences document; and
outputting data from the change log.

19. The non-transitory computer-readable medium of claim 18, where the one or more information records are state documents.

20. The non-transitory computer-readable medium of claim 19, where the state documents and the differences document are generated as extensible markup language (XML) documents.

21. The non-transitory computer-readable medium of claim 18, where detecting a change includes detecting a change to a structure of the database.

22. The non-transitory computer-readable medium of claim 18, where detecting the change to the database object is a result of one or more of, a user driven query, and a logic driven query.

23. The non-transitory computer-readable medium of claim 18, where the data from the change log is output to one or more of, a display logic, a machine readable medium, and an external logic.

24. A system, comprising:
a non-transitory computer-readable medium including means for detecting a change to a database object in a database and for performing a dump of database objects in the database, where a database object includes data from one or more relational data tables;
means for generating a state document, where a state document includes state data describing a state of a database object from the dump;
means for storing one or more state documents;
means for comparing content differences between two or more of the state documents;
means for generating a differences document by merging two or more of the state documents, where a differences document includes data describing one or more content differences between the two or more state documents, where the differences documents includes notations that describe differences between the two or more state documents, and where the notations provide a history of changes in for the database; and
means for outputting data from the differences document.

* * * * *

UNITED STATES PATENT AND TRADEMARK OFFICE
CERTIFICATE OF CORRECTION

PATENT NO.           : 8,234,248 B2
APPLICATION NO.      : 12/151942
DATED                : July 31, 2012
INVENTOR(S)          : Karimisetty et al.

Page 1 of 1

It is certified that error appears in the above-identified patent and that said Letters Patent is hereby corrected as shown below:

On Title page, in column 2, under "Other Publications", line 19-21, after "23 pgs." delete "US Patent and Trademark Office Final Office Action in co-pending U.S. Appl. No. 12/151,943 (filed May 9, 2008), having a notification date of Oct. 11, 2011." and insert the same below "23 pgs." as a new entry.

On sheet 7 of 10, Box No. 772, in figure 7, line 1, delete "Readible" and insert -- Readable --, therefor.

Signed and Sealed this
Nineteenth Day of March, 2013

Teresa Stanek Rea
*Acting Director of the United States Patent and Trademark Office*